United States Patent
Kolegayev

(10) Patent No.: US 10,241,886 B2
(45) Date of Patent: Mar. 26, 2019

(54) APPLICATION PERFORMANCE PERCEPTION METER

(71) Applicant: SugarCRM Inc., Cupertino, CA (US)

(72) Inventor: Dmitriy Kolegayev, West Hollywood, CA (US)

(73) Assignee: SUGARCRM INC., Cupertino, CA (US)

( * ) Notice: Subject to any disclaimer, the term of this patent is extended or adjusted under 35 U.S.C. 154(b) by 1307 days.

(21) Appl. No.: 14/295,494

(22) Filed: Jun. 4, 2014

(65) Prior Publication Data
US 2015/0355992 A1 Dec. 10, 2015

(51) Int. Cl.
 *G06F 11/34* (2006.01)
 *G06F 11/30* (2006.01)
 *G06F 9/50* (2006.01)

(52) U.S. Cl.
 CPC ......... *G06F 11/3433* (2013.01); *G06F 9/50* (2013.01); *G06F 11/3024* (2013.01); *G06F 2209/508* (2013.01)

(58) Field of Classification Search
 CPC .. G06F 11/30; G06F 11/3433; G06F 11/3409; G06F 11/3428; G06F 11/328
 See application file for complete search history.

(56) References Cited

U.S. PATENT DOCUMENTS

| | | | | |
|---|---|---|---|---|
| 7,174,379 B2* | 2/2007 | Agarwal | ................. | G06F 9/505 709/226 |
| 8,324,335 B2* | 12/2012 | Ito | ........................... | C08F 10/00 525/240 |
| 2010/0058349 A1* | 3/2010 | Diwakar | ............... | G06F 9/5044 718/104 |
| 2011/0270795 A1* | 11/2011 | Smith | .................... | G06F 9/5011 706/52 |
| 2014/0066052 A1* | 3/2014 | Chang | ..................... | H04L 43/08 455/423 |

* cited by examiner

*Primary Examiner* — Andrew Schechter
*Assistant Examiner* — Catherine T. Rastovski
(74) *Attorney, Agent, or Firm* — Steven M. Greenberg, Esq.; Shutts & Bowen LLP

(57) ABSTRACT

Embodiments of the present invention provide a method, system and computer program product for application performance perception metering. In an embodiment of the invention, an application performance perception metering method includes initially monitoring resource performance in a computing device during utilization of a computer program through the computing device. Thereafter, the monitored resource performance is compared with historical resource performance during past utilization of the computer program through the computing device. Finally, a prompt can be displayed in the computing device responsive to a determination that the monitored resource performance is deficient relative to the historical resource performance. However, a prompt also can be displayed in the computing device indicating that the computer program is performing poorly based upon a determination that the monitored resource consumption is comparable to the historical resource consumption.

17 Claims, 1 Drawing Sheet

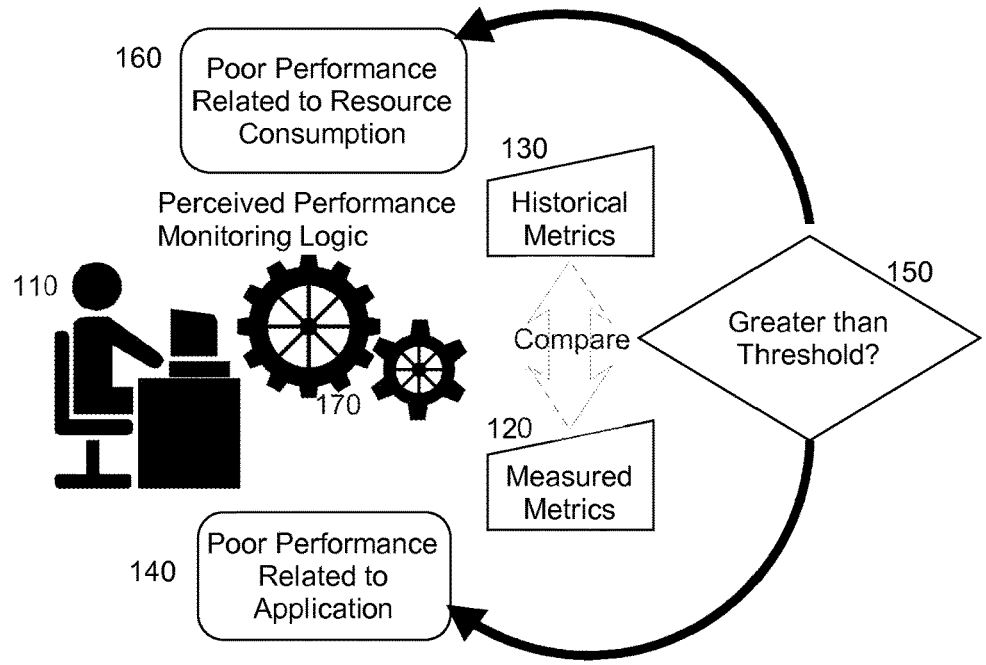
FIG. 1
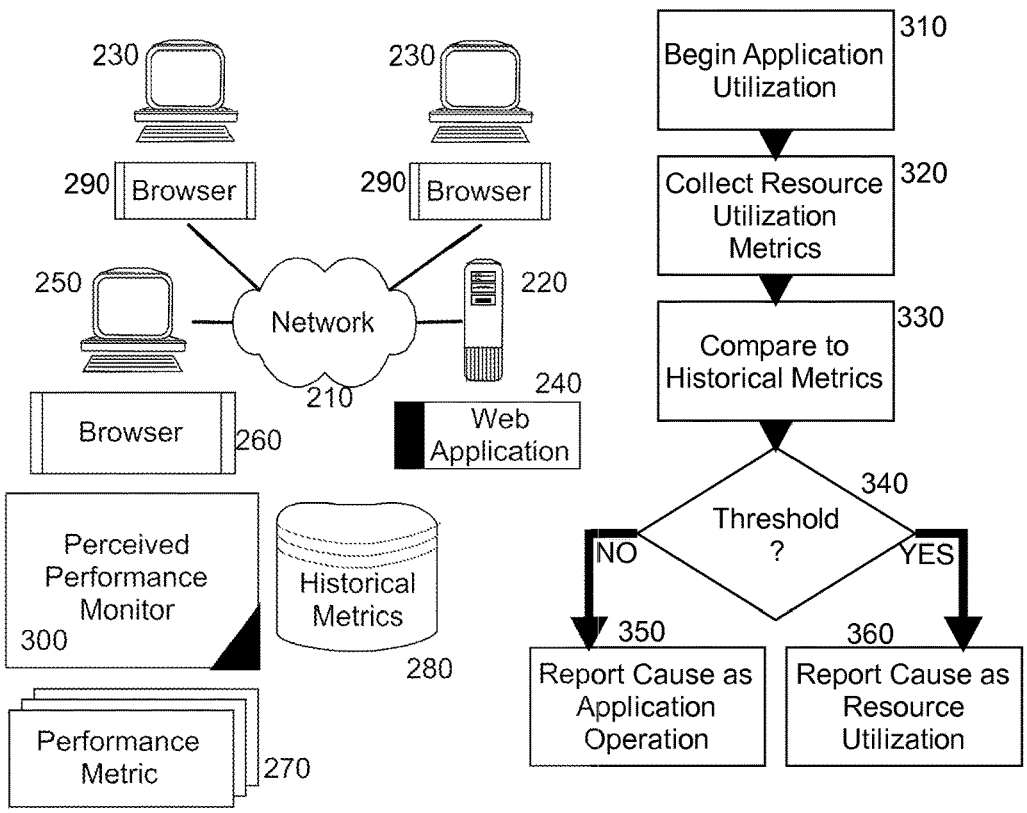
FIG. 2
FIG. 3

APPLICATION PERFORMANCE PERCEPTION METER

BACKGROUND OF THE INVENTION

Field of the Invention

The present invention relates to application performance monitoring and more particularly to visualizing application performance of a computer program.

Description of the Related Art

Application performance refers to the performance of a computer program during its operation. The performance can pertain to the speed at which tasks are performed, the utilization of memory, fixed storage space consumed, or any combination thereof. Of note, performance can be actual or perceived. Actual performance of a computer program can be readily measured by performance monitors—namely by measuring the number of transactions or operations performed by the computer program over a fixed period of time. Other performance monitors can easily monitor the amount of processor resources consumed by the computer program during operation, the amount of disk space consumed by the computer program, or the amount of memory consumed during the operation of the computer program.

Perceived performance, however, differs from actual performance. Perceived performance is the performance of a computer program as perceived by the end user. In this regard, irrespective of the consumption of resources by the computer program, an end user will perceive a poorly performing computer program when that computer program fails to respond to the input of the end user within a reasonable amount of time. In the case of a Web application, perceived poor performance can occur when the Web application appears to be non-responsive, or very slow to respond. Yet, in many cases, the appearance of non-responsiveness can have little to do with the computer program itself and can have everything to do with the environment in which the computer program executes, or with the environment through which the end user interacts with the computer program.

As an additional matter, the performance of a computer program can be relative. Some computer programs due to the their very nature can always appear to be performing poorly even though those programs may be performing nominally as designed. When viewed objectively through the eyes of many different end users concurrently accessing the computer program, a computer program performing identically to all of the different end users will be recognized as performing nominally. But, to the singular one of the different end users utilizing the computer program, the computer program may appear to be performing poorly. Without the benefit of the interactive experiences of the remaining ones of the different end users, the singular end user will not understand the computer program to be performing nominally.

The end result, then will be the end user perceiving poor performance unnecessarily expending resources seeking to trouble shoot the computer program, whether through interactions with a help desk, or self-help—when in fact, the computer program is performing nominally.

BRIEF SUMMARY OF THE INVENTION

Embodiments of the present invention address deficiencies of the art in respect to performance monitoring and provide a novel and non-obvious method, system and computer program product for application performance perception metering. In an embodiment of the invention, an application performance perception metering method includes initially monitoring resource performance in a computing device during utilization of a computer program through the computing device. Thereafter, the monitored resource performance is compared with historical resource performance during past utilization of the computer program through the computing device. Finally, a prompt can be displayed in the computing device responsive to a determination that the monitored resource performance is deficient relative to the historical resource performance. However, a prompt also can be displayed in the computing device indicating that the computer program is performing poorly based upon a determination that the monitored resource consumption is comparable to the historical resource consumption.

In another embodiment of the invention, a data processing system is configured for application performance perception metering. The system includes a host computing system that has at least one computer with memory and at least one processor. The system also includes a computer program providing a user interface accessible in the host computing system. Finally, the system includes an application performance perception meter executing in memory of the host computing system. The meter includes program code enabled to monitor resource performance in the host computing device during utilization of the computer program, to compare the monitored resource performance with historical resource performance during past utilization of the computer program, and to display a prompt in the user interface responsive to determining that the monitored resource performance is deficient relative to the historical resource performance.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for application performance perception metering;

FIG. 2 is a schematic illustration of a data processing system configured for application performance perception metering; and, FIG. 3 is a flow chart illustrating a process for application performance perception metering.

DETAILED DESCRIPTION OF THE INVENTION

Embodiments of the invention provide for application performance perception metering. In accordance with an embodiment of the invention, resource consumption experienced during the utilization by an end user of a computer program such as a Web application can be monitored. For instance, the resource consumption can include memory utilization and network throughput. Further, the resource consumption can be correlated to the performance of the computer program, for example in reference to a table expressly associating different resources and the consumption thereof with the performance of the computer program, or by detecting a threshold change in resource consumption concurrently with the utilization of the computer program. Thereafter, the monitored resource consumption can be compared to historical resource consumption experienced also when accessing the same computer program. To the extent the monitored resource consumption is deficient relative to the historical resource consumption, the end user can be prompted with an indication that the computer program may be perceived as performing poorly, but that the perceived poor performance is in fact due deficient resources. Alternatively, to the extent the monitored resource compares within a threshold to the historical resource consumption, the end user can be prompted that the perceived poor performance is in fact due to the poor performance of the computer program.

In further illustration, FIG. 1 pictorially shows a process for application performance perception metering. As shown in FIG. 1, perceived performance monitoring logic 170 can monitor resource consumption metrics 120 concurrently with the utilization by an end user 110 of a computer program. The perceived performance monitoring logic 170 additionally can determine whether or not the resource consumption metrics 120 pertain to the utilization by the end user 110 of the computer program. The perceived performance monitoring logic 170 yet further can compare the monitored resource consumption metrics 120 with historical resource consumption metrics 130 previously acquired during the utilization of the computer program by the end user 110. Optionally, the historical resource consumption metrics 130 can include resource consumption metrics previously acquired during the utilization of the computer program by other end users.

Thereafter, the perceived performance monitoring logic 170 can determine from the comparison if a threshold 150 difference exists between the monitored resource consumption metrics 120 and the historical resource consumption metrics 130 previously acquired during the utilization of the computer program by the end user 110. If not, the end user 110 can be prompted 140 that any perceived poor performance of the computer program is due to the computer program itself. Otherwise, if a threshold 150 difference exists and if it had been determined that the resource consumption metrics 120 pertain to the utilization by the end user 110 of the computer program, the end user 110 can be prompted 160 that any perceived poor performance of the computer program is not due to the computer program, but to the excessive consumption of resources such as memory or network throughput. In this way, the end user 110 may enjoy a better understanding of why it may seem that the computer program performs poorly without necessarily assuming that the perceived poor performance is due to the computer program itself.

The process illustrated in connection with FIG. 1 can be implemented in a data processing system. In yet further illustration, FIG. 2 schematically shows a data processing system configured for application performance perception metering. The system can include a computing device 250 communicatively coupled over computer communications network 210 to a host computing system 220 that includes one or more computers, each with memory and at least one processor. The host computing system 220 can support the operation of a Web application 240 accessible by the computing device 250 by way of a browser 260, and also other computing devices 230 through respective browsers 290.

A perceived performance monitor 300 can execute in the memory of the computing device 250. The perceived performance monitor 300 can include program code that when executed in memory of the computing device 250 can be enabled to monitor performance metrics of the computing device during access through the browser 260 of the Web application. The performance metrics 270 can include memory utilization, disk space utilization, processor utilization and network bandwidth and throughput. The program code of the perceived performance monitor 300 also can be enabled to compare the performance metrics 270 to historical metrics 280 collected previously at the computing device 250, or optionally at the other computing devices 230.

The program code of the perceived performance monitor 300 yet further can be enabled to display an indicator in the browser 260 that any perceived poor performance of the Web application is owing to the utilization of resources in the computing device 250 and not owing to the Web application itself when the performance metrics 270 as monitored exceed those of the historical metrics 280 by a threshold value. Otherwise, the program code of the perceived performance monitor 300 can be enabled to display an indicator in the browser 260 that any perceived poor performance of the Web application indeed is owing to the Web application itself.

In even yet further illustration of the operation of the perceived performance monitor 300, FIG. 3 is a flow chart illustrating a process for application performance perception metering. Beginning in block 310, application utilization of a computer program through a computing device can begin. In block 320, resource utilization metrics in the computing device can be monitored and recorded into memory of the computing device. In block 330, the recorded resource utilization metrics can be compared to historical resource utilization metrics acquired during previous utilization of the same computer program, either through the computing device or the computing devices of others. In decision block 340, if the recorded resource utilization metrics do not differ from the historical resource utilization metrics by a threshold value, in block 350, the computer program can be reported as the likely cause of any perceived poor performance of the computer program. Otherwise, in block 360 the utilization of the resources rather than the computer program can be reported as the likely cause of any perceived poor performance of the computer program.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. An application performance perception metering method comprising:
   monitoring historical resource performance in a computing device during utilization of a computer program through the computing device;
   storing in a table a record correlating the utilization of the computer program with the resource performance as monitored;
   contemporaneously re-utilizing the computer program, re-monitoring resource performance during the contemporaneous re-utilization, and detecting during the contemporaneous re-utilization, a poor performance of the computer program; and,
   responsive to the detection of the poor performance,
   comparing the re-monitored resource performance with the historical resource performance as stored in the table; and,
   displaying an indication that the detected poor performance is due to a deficiency in resources on condition that the re-monitored resource performance is deficient relative to the historical resource performance, but otherwise displaying an indication that the detected poor performance is due to the computer program.

2. The method of claim 1, wherein the resource performance is available memory.

3. The method of claim 1, wherein the resource performance is network throughput.

4. The method of claim 1, wherein the resource performance is processor consumption.

5. The method of claim 1, wherein the historical resource performance is resource performance measured for other end users accessing the computer program on their respective computer devices.

6. The method of claim 1, wherein the computer program is a Web application accessed through Web browser over a computer communications network.

7. A data processing system configured for application performance perception metering, the system comprising:
   a host computing system comprising at least one computer with memory and at least one processor;
   a computer program providing a user interface accessible in the host computing system; and,
   an application performance perception meter executing in memory of the host computing system, the meter comprising program code enabled to monitor historical resource performance in the host computing device during utilization of the computer program, to store in a table a record correlating the utilization of the computer program with the resource performance as monitored, contemporaneously re-utilize the computer program, re-monitor resource performance during the contemporaneous re-utilization, and detect during the contemporaneous re-utilization, a poor performance of the computer program, and responsive to the detection of the poor performance, to compare the re-monitored resource performance with the historical resource performance as stored in the table, and to display an indication that the detected poor performance is due to a deficiency in resources on condition that the re-monitored resource performance is deficient relative to the historical resource performance, but otherwise to display an indication that the detected poor performance is due to the computer program.

8. The system of claim 7, wherein the resource performance is available memory.

9. The system of claim 7, wherein the resource performance is network throughput.

10. The system of claim 7, wherein the historical resource performance is resource performance measured for other end users accessing the computer program.

11. The system of claim 7, wherein the computer program is a Web application accessed through Web browser over a computer communications network.

12. A computer program product for application performance perception metering, the computer program product comprising a computer readable storage medium having program instructions embodied therewith, the program instructions executable by a device to cause the device to perform a method comprising:
    monitoring historical resource performance in a computing device during utilization of a computer program through the computing device;
    storing in a table a record correlating the utilization of the computer program with the resource performance as monitored;
    contemporaneously re-utilizing the computer program, re-monitoring resource performance during the contemporaneous re-utilization, and detecting during the contemporaneous re-utilization, a poor performance of the computer program; and,
    responsive to the detection of the poor performance,
    comparing the re-monitored resource performance with the historical resource performance as stored in the table; and,
    displaying an indication that the detected poor performance is due to a deficiency in resources on condition that the re-monitored resource performance is deficient relative to the historical resource performance, but otherwise displaying an indication that the detected poor performance is due to the computer program.

13. The computer program product of claim 12, wherein the resource performance is available memory.

14. The computer program product of claim 12, wherein the resource performance is network throughput.

15. The computer program product of claim 12, wherein the resource performance is processor consumption.

16. The computer program product of claim 12, wherein the historical resource performance is resource performance measured for other end users accessing the computer program.

17. The computer program product of claim 12, wherein the computer program is a Web application accessed through Web browser over a computer communications network.

* * * * *